(12) United States Patent
Yeon et al.

(10) Patent No.: US 11,747,477 B2
(45) Date of Patent: Sep. 5, 2023

(54) DATA COLLECTING METHOD AND SYSTEM

(71) Applicant: NAVER LABS CORPORATION, Seongnam-si (KR)

(72) Inventors: Su Yong Yeon, Seongnam-si (KR); Soo Hyun Ryu, Seongnam-si (KR); Dong Hwan Lee, Seongnam-si (KR); Jeong Hee Kim, Seongnam-si (KR); Kay Park, Seongnam-si (KR); Sang Ok Seok, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 790 days.

(21) Appl. No.: 16/582,591

(22) Filed: Sep. 25, 2019

(65) Prior Publication Data

US 2020/0103529 A1 Apr. 2, 2020

(30) Foreign Application Priority Data

Sep. 28, 2018 (KR) .......................... 1020180116177

(51) Int. Cl.
*G01S 17/89* (2020.01)
*H04W 4/38* (2018.01)
(Continued)

(52) U.S. Cl.
CPC .......... *G01S 17/89* (2013.01); *G01S 5/02522* (2020.05); *G01S 5/02525* (2020.05);
(Continued)

(58) Field of Classification Search
CPC ........ G01S 17/89; G01S 7/4808; G01S 17/87; H04W 4/38; H04W 4/33; H04W 4/029; H04W 4/021
See application file for complete search history.

(56) References Cited

U.S. PATENT DOCUMENTS 10,723,018 B2 * 7/2020 Griffin ................. G05D 1/0274
2014/0379256 A1 12/2014 Stipes et al.
(Continued)

FOREIGN PATENT DOCUMENTS

EP 3367199 A1 8/2018
JP 2016540186 A 12/2016
(Continued)

OTHER PUBLICATIONS

Office Action issued in Korean patent application No. 10-2018-0116177, dated Jan. 22, 2019.
(Continued)

*Primary Examiner* — John E Breene
*Assistant Examiner* — Christine Y Liao
(74) *Attorney, Agent, or Firm* — Greer Burns & Crain Ltd.

(57) ABSTRACT

The data collecting method includes: collecting first and second sensor data respectively through a first and a second sensors while a data collecting apparatus moves within a target area, and tagging a first and a second timestamp values respectively to the first and the second sensor data; generating map data of the target area and location data at a point of time corresponding to the first timestamp value, based on the first sensor data; generating map information of the target area based on the map data, and generating moving path information on the map based on the location data; and estimating a sensing location at a point of time corresponding to the second timestamp value based on the moving path information, and tagging the sensing location to the second sensor data.

11 Claims, 7 Drawing Sheets

(51) Int. Cl.
*H04W 4/33* (2018.01)
*H04W 4/029* (2018.01)
*G01S 7/48* (2006.01)
*G01S 17/87* (2020.01)
*H04W 4/021* (2018.01)
*G01S 5/02* (2010.01)

(52) U.S. Cl.
CPC ............ *G01S 7/4808* (2013.01); *G01S 17/87* (2013.01); *H04W 4/021* (2013.01); *H04W 4/029* (2018.02); *H04W 4/33* (2018.02); *H04W 4/38* (2018.02)

(56) References Cited

U.S. PATENT DOCUMENTS

| | | | |
|---|---|---|---|
| 2015/0092048 A1 | 4/2015 | Brunner et al. | |
| 2015/0094089 A1 | 4/2015 | Moeglein et al. | |
| 2015/0185054 A1 | 7/2015 | Hesch et al. | |
| 2015/0237479 A1* | 8/2015 | Fung | G06T 7/246 |
| | | | 455/456.6 |
| 2016/0071294 A1* | 3/2016 | Park | G06T 7/55 |
| | | | 345/441 |
| 2016/0148417 A1* | 5/2016 | Kim | G06T 19/006 |
| | | | 345/419 |
| 2017/0307393 A1* | 10/2017 | Kobayashi | G01S 5/0264 |

FOREIGN PATENT DOCUMENTS

| | | |
|---|---|---|
| KR | 1020120029976 A1 | 3/2012 |
| KR | 20150124535 A | 11/2015 |
| KR | 101722068 B1 | 3/2017 |
| KR | 1020170128158 A | 11/2017 |
| KR | 1020180029818 A | 3/2018 |
| KR | 1020180067199 A | 6/2018 |
| WO | 2019035540 A1 | 2/2019 |

OTHER PUBLICATIONS

Office Action issued in corresponding Korean Patent application No. 10-2019-0015181, dated Mar. 11, 2020.

Office Action issued in corresponding Japanese Patent application No. 2019-161436, dated Oct. 20, 2020 (with translation).

Ramsey M. Faragher et al.; "Towards an Efficient, Intelligent, Opportunistic Smartphone Indoor Position System"; Journal Of The Institute Of Navigation, Institute Of Navigation, Fairfax, VA, US, vol. 62, No. 1, Mar. 1, 2015.

EP search report issued in European Patent application No. 19198736.1, dated Feb. 21, 2020.

* cited by examiner

DATA COLLECTING METHOD AND SYSTEM

CROSS-REFERENCE TO RELATED APPLICATION

This application claims priority under 35 U.S.C. § 119 to Korean Patent Application No. 10-2018-0116177 filed on Sep. 28, 2018, in the Korean Intellectual Property Office, the entire content of which are incorporated herein by reference.

BACKGROUND OF THE INVENTION

1. Field

One or more embodiments of the present invention relate to a method and system for collecting data, and more particularly, to a method and system for collecting sensor data to which an indoor location is tagged.

2. Description of Related Art

This section provides background information related to the present disclosure which is not necessarily prior art.

In order to provide a location-based service to a user, it is required to obtain accurate location information of the user or a target object. Such location information is generally obtained based on a global positioning system (GPS) signal. However, it is very difficult to measure a location of the user or the target object in a GPS signal gray area, such as an area between high buildings, or a space difficult for the GPS signal to reach, such as the inside of a building.

As a method of providing a location-based service even in a space difficult for a GPS signal to reach, such as the inside of a building, "Method and apparatus for collecting reference information for indoor wireless positioning, and indoor wireless positioning service method using plurality of access points provided indoors" of KR 10-2012-0029976 (published on Mar. 27, 2012) discloses a method of collecting reference point information for indoor wireless positioning by collecting scan information regarding an indoor access point, mapping scan information regarding a monitoring access point on an indoor map by using pre-set location information of at least one monitoring access point, generating location information on the indoor map regarding at least one virtual access point obtained through the scan information, by using scan information of the at least one virtual access point, and generating identification information regarding each cell pre-set on the indoor map and including the monitoring access point and the virtual access point. However, according to such a method, indoor map information needs to pre-exist.

BRIEF SUMMARY OF THE INVENTION

This section provides a general summary of the inventive concept, and is not a comprehensive disclosure of its full scope or all features of the inventive concept.

One or more embodiments include a method of collecting sensor data to which a sensing location is tagged by using a data collecting apparatus while measuring a location of the data collecting apparatus and creating a map by moving around an indoor space and searching a perimeter.

Additional aspects will be set forth in part in the description which follows and, in part, will be apparent from the description, or may be learned by practice of the presented embodiments.

According to one or more embodiments, a data collecting method using a data collecting apparatus having a first sensor and a second sensor is provided. The data collecting method includes: performing, by a processor, a timestamping operation by collecting first sensor data and second sensor data respectively through the first sensor and the second sensor while the data collecting apparatus moves within a target area, and tagging a first timestamp value and a second timestamp value respectively to the first sensor data and the second sensor data; performing, by the processor, a data generating operation by generating map data of the target area, and location data at a point of time corresponding to the first timestamp value, based on the first sensor data collected while the data collecting apparatus moves; performing, by the processor, an information generating operation by generating map information regarding a map of the target area based on the map data, and generating moving path information regarding a moving path on the map based on the location data; performing, by the processor, a tagging operation by estimating a sensing location at a point of time corresponding to the second timestamp value based on the moving path information, and tagging the sensing location to the second sensor data; and performing, by the processor, a storing operation by storing the second sensor data to which the sensing location is tagged.

According to one or more embodiments, a data collecting system includes: a movable first sensor; a movable second sensor; and at least one processor in communication with the first sensor and the second sensor, and having a plurality of functional modules each configured to perform a predefined function. The functional modules including a timestamping module configured to collect first sensor data and second sensor data respectively through the first sensor and the second sensor while the first sensor and the second sensor move with a target area, and tag a first timestamp value and a second timestamp value respectively to the first sensor data and the second sensor data; a simultaneous localization and mapping (SLAM) module configured to generate map data of the target area based on the first sensor data, generate location data at a point of time corresponding to the first timestamp value, generate map information regarding a map of the target area based on the map data, and generate moving path information regarding a moving path on the map, based on the location data; a tagging module configured to estimate a sensing location at a point of time corresponding to the second timestamp value based on the moving path information, and tag the sensing location to the second sensor data; and a storing module configured to store the second sensor data to which the sensing location is tagged.

According to one or more embodiments, a data collecting method using a data collecting apparatus having a first sensor and a second sensor is provided. The data collecting method includes: performing, by a first processor, a timestamping operation by collecting first sensor data and second sensor data respectively through the first sensor and the second sensor while the data collecting apparatus moves within a target area, and tagging a first timestamp value and a second timestamp value respectively to the first sensor data and the second sensor data; performing, by a second processor, a data generating operation by generating map data of the target area, and location data at a point of time corresponding to the first timestamp value, based on the first sensor data collected while the data collecting apparatus moves; performing, by the second processor, an information generating operation by generating map information regarding a map of the target area based on the map data, and generating moving path information regarding a moving path on the map based on the location data; performing, by the second processor, a tagging operation by estimating a sensing location at a point of time corresponding to the second timestamp value based on the moving path information, and tagging the sensing location to the second sensor data; and performing, by the second processor, a storing operation by storing the second sensor data to which the sensing location is tagged According to one or more embodiments, a data collecting method is provided. The data collecting method includes: performing a timestamping operation by collecting first sensor data and second sensor data respectively through a first sensor and a second sensor as a data collecting apparatus including the first sensor and the second sensor moves inside a target building, and tagging a first timestamp value and a second timestamp value respectively to the first sensor data and the second sensor data; performing a data generating operation by generating temporary map data of the target building and temporary location data at a point of time corresponding to the first timestamp value, based on the first sensor data collected as the data collecting apparatus moves; performing a detecting operation by detecting a loop closure in which the data collecting apparatus re-visits a location that has been passed; performing a loop closing operation by correcting the temporary location data in response to the detecting of the loop closure to generate corrected location data, and generating moving path information and indoor map information of the target building based on the corrected location data; performing a tagging operation by estimating a sensing location at a point of time corresponding to the second timestamp value based on the moving path information, and tagging the sensing location to the second sensor data; and performing a storing operation by storing the second sensor data to which the sensing location is tagged.

According to one or more embodiments, a data collecting system includes: a first sensor; a second sensor; a timestamping module configured to collect first sensor data and second sensor data respectively through the first sensor and the second sensor, and tag a first timestamp value and a second timestamp value respectively to the first sensor data and the second sensor data; a simultaneous localization and mapping (SLAM) module configured to generate temporary map data of a target building based on the first sensor data, generate temporary location data at a point of time corresponding to the first timestamp value, detect a loop closure in which a data collecting apparatus re-visits a location that has been passed, correct the temporary location data in response to the detection of the loop closure to generate corrected location data, and generate moving path information and indoor map information of the target building based on the corrected location data; a tagging module configured to estimate a sensing location at a point of time corresponding to the second timestamp value based on the moving path information, and tag the sensing location to the second sensor data; and a storing module configured to store the second sensor data to which the sensing location is tagged.

According to one or more embodiments, a computer program is stored in a medium to perform the data collecting method by using a computer.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
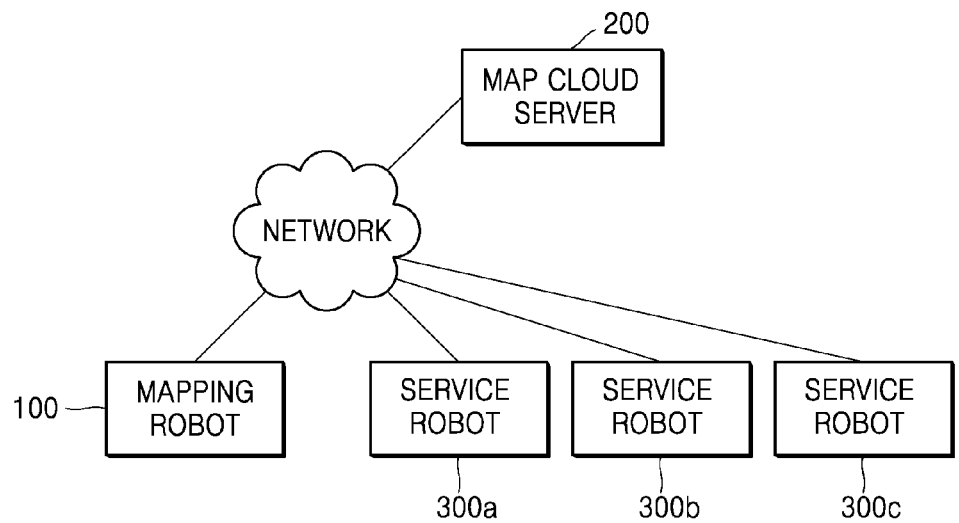
FIG. 1 is a diagram of an example of a configuration of an overall system according to an embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by the example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/

DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

FIG. 1 is a diagram of an example of a configuration of an overall system according to an embodiment.

Referring to FIG. 1, a mobile mapping robot 100, a map cloud server 200, and service robots 300a through 300c, referred to as a service robot 300 when described in general, are communicably connected to each other through a network.

The mapping robot 100 and the service robots 300a through 300c may be apparatuses operating inside a particular building where a global positioning system (GPS) signal is not receivable. In the present specification, the particular building where the mapping robot 100 and the service robots 300a through 300c operate will be referred to as a target building. An interior map of the target building does not pre-exist, and indoor map information of the target building may be generated by the mapping robot 100. In the present disclosure, the target building or an indoor space of the target building may be referred to as a target area.

Hereinafter, for convenience of description, the mapping robot 100 and the service robot 300 are described as robot apparatuses including a mobile platform, but embodiments of the present disclosure are not limited thereto. The mapping robot 100 and the service robot 300 may include service platforms including a sensor, for example, a device such as a mobile terminal, a laptop computer, or a computer, or the like.

In the present specification, the mapping robot 100 is a mobile apparatus for generating the indoor map information of the target building, and may be referred to as a mobile data collecting apparatus. In the present specification, a representative example of the mobile data collecting apparatus includes the mapping robot 100, but is not limited thereto.

The service robots 300a through 300c may identify their locations by using the indoor map information of the target building generated by the mapping robot 100, and perform service functions assigned thereto. The service robots 300a through 300c may not only identify their locations by using the indoor map information of the target building, but may also autonomously drive along a path to a desired place. The service robots 300a through 300c may perform a logistics service, a customer guiding service, a security service, or the like, according to a task assigned thereto. The number of service robots 300a through 300c shown in FIG. 1 does not limit the present disclosure.

The map cloud server 200 may be a computing apparatus that stores the indoor map information of the target building generated by the mapping robot 100 and provides the indoor map information to the service robot 300. The map cloud server 200 may calculate and provide a path along which the service robot 300 moves. In FIG. 1, the map cloud server 200 is connected to the mapping robot 100 through the network, but this is only an example. The map cloud server 200 may be provided inside the mapping robot 100, and in this case, a function of the map cloud server 200 may be performed by the mapping robot 100. In the present specification, the data collecting apparatus may be a concept including the mapping robot 100 and the map cloud server 200.

The mapping robot 100, the map cloud server 200, and the service robot 300 may transmit or receive data by using the network. The network may include a wireless communication network connected to the mapping robot 100 and the service robot 300, and a wired communication network connected to the map cloud server 200. The wireless communication network may include a mobile communication network, a wireless local area network (LAN), and a short distance wireless communication network. Wireless communication may include cellular communication using at least one of, for example, long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). According to an embodiment, the wireless communication network may include at least one of wireless fidelity (WiFi), Bluetooth, Bluetooth low energy (BLE), Zigbee, near field communication (NFC), and radio frequency (RF). The wired communication network may include at least one of, for example, universal serial bus (USB), high definition multimedia interface (HDMI), recommended standard-232 (RS-232), power line communication, or plain old telephone service (POTS).

The network may include at least one of a telecommunication network, a computer network, an Internet network, or a telephone network. The network may include one or more networks among a personal area network (PAN), an LAN, a campus area network (CAN), a metropolitan area network (MAN), a wide area network (WAN), a broadband network (BBN), and the Internet. The network may include one or more network topologies including a bus network, a start network, a ring network, a mesh network, a star-bus network, and a tree or hierarchical network, but is not limited thereto.

The service robot 300 may verify its location by using the indoor map information of the target building provided by the map cloud server 200. The indoor map information may include not only information on the indoor space of the target building, but also sensor data enabling the service robot 300 to verify its location. The sensor data may include different sensor values according to a location inside the target building. For example, the sensor data may include image data captured at different locations in the target building. The sensor data may include data of wireless signals (for example, a WiFi signal, a Bluetooth signal, a Zigbee signal, and the like) measured at different locations in the target building. The data of wireless signals may include types and intensities of the wireless signals. The sensor data may include geomagnetic values measured at different locations in the target building.

The sensor data provided from the map cloud server 200 has different values based on different locations in the target building, and the service robot 300 is able to accurately verify its location by using the sensor data when a location corresponding to the value is accurate. In general, sensor data is collected by repeating processes of locating a sensor at a particular location of a target building and then measuring a sensor output, at all pre-set locations in the target building. When the sensor data is collected through such processes, it is difficult to accurately locate the sensor at the pre-set particular location, and a long time is consumed to measure the sensor values at all pre-set locations.

The mapping robot 100 according to the present disclosure may collect not only first sensor data, but also second sensor data by moving inside the target building. The mapping robot 100 may tag a first timestamp value and a second timestamp value respectively to the first sensor data and the second sensor data. The mapping robot 100 may generate temporary map data and temporary path information by using the collected first sensor data, and when a loop closure is detected, correct the temporary map data by performing loop closing to generate the indoor map information of the target building, and generate moving path information by correcting the temporary path information. The first sensor data is data for generating the indoor map information and the moving path information, and may be referred to as space data. The moving path information is information about a path along which the mapping robot 100 moved.

The mapping robot 100 may accurately estimate a sensing location coordinates where the mapping robot 100 was located at a point of time when the second sensor data is obtained, by using the first and second timestamp values tagged to the first and second sensor data. The mapping robot 100 may accurately map the second sensor data and sensing location coordinates of the second sensor data by tagging the estimated sensing location coordinates to the second sensor data. Accordingly, the second sensor data collected from each of a plurality of locations in the target building may be stored after being tagged to accurate sensing location coordinates, and since such a process is performed while the mapping robot 100 generates the indoor map information of the target building, there is barely any additional time required.

FIG. 1 illustrates an example of a system capable of performing a data collecting method according to an embodiment of the present disclosure. The data collecting method according to the present disclosure is described as being performed by the mapping robot 100 of FIG. 1, but may alternatively performed by a portable computing apparatus, such as a smart phone or a laptop computer.

The data collecting method according to the present disclosure may be performed by the mapping robot 100 and the map cloud server 200, and in this case, the mapping robot 100 and the map cloud server 200 may configure one data collecting apparatus.

For example, the mapping robot 100 may move to collect the first and second sensor data through first and second sensors, and timestamp the first and second timestamp values respectively to the first and second sensor data. The mapping robot 100 may provide the first and second sensor data to which the first and second timestamp values are respectively timestamped to the map cloud server 200.

The map cloud server 200 may generate the temporary map data based on the first sensor data, and generate temporary location data at a point of time corresponding to the first timestamp value. The map cloud server 200 may detect the loop closure, and when the loop closure is detected, correct the temporary location data to generate corrected location data, and generate the moving path information and the indoor map information of the target building based on the corrected location data. The map cloud server 200 may estimate a sensing location at a point of time corresponding to the second timestamp value based on the moving path information, and tag the sensing location to the second sensor data. The map cloud server 200 may store the second sensor data to which the sensing location is tagged.

The corrected location data and the sensing location may include direction information. For example, the corrected location data and the sensing location may be a concept including both location information for specifying a location on a space and direction information for specifying a direction at the location.

Figure 2:
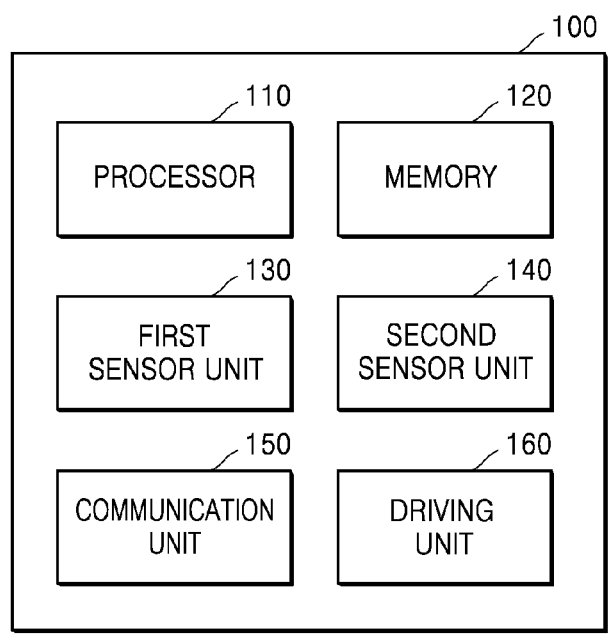
FIG. 2 is a block diagram for describing an internal configuration of a mapping robot, according to an embodiment.

FIG. 2 is a block diagram for describing an internal configuration of the mapping robot 100, according to an embodiment.

Referring to FIG. 2, the mapping robot 100 includes a processor 110, a memory 120, a first sensor unit 130, a second sensor unit 140, a communication unit 150, and a driving unit 160.

The processor 110 operates according to codes stored in the memory 120, and controls overall operations of the first sensor unit 130, the second sensor unit 140, the communication unit 150, and the driving unit 160. The memory 120 may store the codes for operating the processor 110, and store data generated by operations of the processor 110. The processor 110 may generate the indoor map information of the target building and the moving path information by using the first and second sensor data collected from the first and second sensor units 130 and 140, and generate the second sensor data to which the sensing location is tagged. The processor 110 will now be described in further detail.

The first sensor unit 130 may generate space data (for example, the first sensor data) used by the processor 110 to generate the indoor map information of the target building and the moving path information, as the first sensor 130 moves through the target building on the mapping robot 100. The first sensor unit 130 may include at least one of a laser scanner, a camera, or a red, green, blue, depth (RGBD) sensor. The laser scanner is an apparatus that emits laser beams, receives the laser beams reflected from surrounding objects, and measures distances to the surrounding objects to precisely picture the surroundings, and may include a Lidar. The laser scanner may be a 3-dimensional (3D) laser scanner and generate 3D space data. The laser scanner may generate 3D space data every pre-set cycle. When the mapping robot 100 moves, the 3D space data generated by the laser scanner changes every frame. The processor 110 may extract feature points of the 3D space data changing every frame and match the feature points to identify the location and moving path of the mapping robot 100 and generate the indoor map information of the target building.

The camera may be, for example, a 360° camera, and may be an apparatus that captures all directions of front, back, left, right, up, and down at the location of the mapping robot 100. The camera may generate the image data by capturing all directions. The processor 110 may extract feature points of the image data changing every frame and match the feature points to identify the location and moving path of the mapping robot 100 and generate the indoor map information of the target building.

According to an embodiment, the processor 110 may analyze the image data obtained by the camera to identify a plane, and analyze a change of planes to generate 3D map data. Also, the processor 110 may identify its location in the 3D map data.

The RGBD sensor is a sensor in which a function of a sensor capturing an RGB image, such as a camera, and a function of a depth sensor detecting a distance to a surrounding target object are combined. The RGBD sensor not only captures an image of a surrounding object, but also measures a distance to the surrounding object. The processor 110 may generate the indoor map information of the target building based on output data of the RGBD sensor and identify its location.

The second sensor unit 140 is an apparatus for generating the second sensor data to which the sensing location is tagged, as the second sensor 140 moves through the target building on the mapping robot 100, and may include at least one of a camera, a WiFi module, a Bluetooth module, or a geomagnetic sensor. The sensing location denotes a location where the second sensor data is obtained, and the second sensor data to which the sensing location is tagged denotes that the sensing location is stored together with the second sensor data. The sensing location may be stored as metadata of the second sensor data. The sensing location may be stored as coordinates on an indoor map of the target building. The second sensor data to which the sensing location is tagged may be stored in the map cloud server 200 and provided to the service robot 300 as a part of the indoor map information of the target building through the network. The second sensor data to which the sensing location is tagged may be stored in the memory 120 of the mapping robot 100.

The second sensor unit 140 may include a plurality of sensors selected from a camera, a WiFi module, a Bluetooth module, and a geomagnetic sensor. For example, the second sensor unit 140 may include a camera and a WiFi module. The second sensor unit 140 may include a 2D laser scanner. The second sensor unit 140 may include a 2D camera. Sensor apparatuses of the second sensor unit 140 may be inexpensive and have a lower performance than a sensor of the first sensor unit 130.

The WiFi module may detect identification information of access points detected at the sensing location and an intensity of a WiFi signal received from each of the access points.

The Bluetooth module may detect identification information of Bluetooth apparatuses detected at the sensing location and an intensity of a WiFi signal received from each of the Bluetooth apparatuses. The geomagnetic sensor may detect a magnetic field of the earth at the sensing location.

The communication unit 150 may be connected to the network to communicate with the map cloud server 200 and/or the service robot 300. The communication unit 150 may be referred to as a communication interface, and may set wireless communication between the mapping robot 100 and an external apparatus, such as the map cloud server 200. Wireless communication may include cellular communication using at least one of, for example, LTE, LTE-A, CDMA, WCDMA, UMTS, WiBro, or GSM. According to an embodiment, the wireless communication may include at least one of WiFi, Bluetooth, BLE, Zigbee, NFC, or RF.

The driving unit 160 is controlled by the processor 110 and enables the mapping robot 100 to move inside the target building. The driving unit 160 may include a motor and a plurality of wheels. For example, the driving unit 160 may include a motor driver, a wheel motor, and a rotation motor. The motor driver may perform a function of driving the wheel motor for driving the mapping robot 100. The wheel motor may drive a plurality of wheels for driving the mapping robot 100. The rotation motor may be driven to rotate or change a direction of the wheel of the mapping robot 100.

The mapping robot 100 may further include an obstacle recognizing unit. The obstacle recognizing unit may include at least one of an infrared sensor, an ultrasonic sensor, a cliff sensor, an attitude sensor, a collision sensor, or an optical flow sensor (OFS). The infrared sensor may include a sensor for receiving a signal of an infrared remote controller for remotely adjusting the mapping robot 100. The ultrasonic sensor may include a sensor for determining a distance between an obstacle and a robot by using an ultrasonic signal. The cliff sensor may include a sensor for detecting a cliff or a precipice in a range of 360°. The attitude sensor (attitude reference system (ARS)) may include a sensor for detecting an attitude of the mapping robot 100. The attitude sensor may include a sensor including triaxial acceleration and triaxial gyroscope for detecting an amount of rotation of the mapping robot 100. The collision sensor may include a sensor for detecting a collision between the mapping robot 100 and the obstacle. The collision sensor may detect the collision between the mapping robot 100 and the obstacle in a range of 360°. The OFS may include a sensor for sensing a phenomenon in which the mapping robot 100 spins with no traction and measuring a driving distance of the mapping robot 100 on various floor surfaces.

Figure 3:
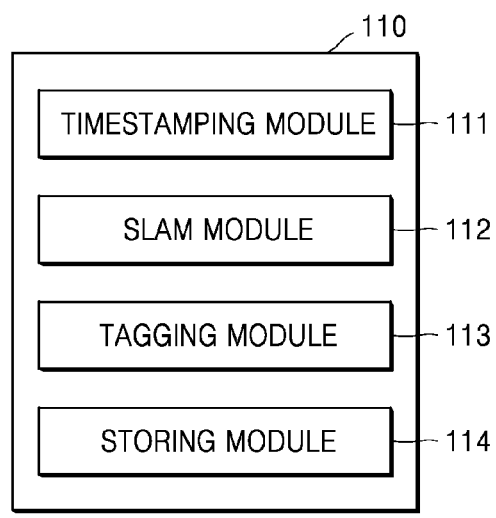
FIG. 3 is a block diagram for describing a processor of a mapping robot, according to an embodiment.

FIG. 3 is a block diagram for describing the processor 110 of the mapping robot 100, according to an embodiment.

Referring to FIG. 3, the processor 110 may include a timestamping module 111, a simultaneous localization and mapping (SLAM) module 112, a tagging module 113, and a storing module 114.

The timestamping module 111 may collect the first sensor data through the first sensor unit 130 and tag the first timestamp value to the first sensor data. The timestamping module 111 may collect the second sensor data through the second sensor unit 140 and tag the second timestamp value to the second sensor data. It is assumed that the first sensor unit 130 is a 3D laser scanner and the second sensor unit 140 is a WiFi module. The first sensor data may be referred to as space data received from the 3D laser scanner exemplified as the first sensor unit 130, and the second sensor data may be referred to as sensor data received from the WiFi module exemplified as the second sensor unit 140.

Timestamping may indicate that a timestamp value corresponding to a point of time when data is received is stored in association with the data or stored as metadata of the data to be tagged to the data. A timestamp is information expressed in a consistent format to indicate a specific point of time, and may be conveniently used to compare two or more points of time or calculate a period. A format of the timestamp does not limit the present disclosure.

The first sensor unit 130 and the second sensor unit 140 may independently operate. Accordingly, a collecting period of the first sensor data of the first sensor unit 130 (for example, the 3D laser scanner) and a collecting period of the second sensor data of the second sensor unit 140 (for example, the WiFi module) are independent of each other. A reception time of the first sensor data and a reception time of the second sensor data may not be synchronized with each other. For example, the first sensor data may be received at time intervals selected between about 1 ms to 100 ms, and the second sensor data may be received at time intervals selected between about 1 ms to 1 sec. Each of the first sensor data and second sensor data may not be received at regular intervals.

The timestamping module 111 may store the first sensor data to which the first timestamp value is tagged and the second sensor data to which the second timestamp value is tagged, in the memory 120. Each of the first sensor data and the second sensor data may be understood as a group of pieces of data sequentially received as the mapping robot 100 moves.

The SLAM module 112 may perform a simultaneous location estimation and mapping function, based on the first sensor data, and estimate a path along which the mapping robot 100 is moved. Because the first timestamp values are tagged to the first sensor data, the SLAM module 112 may identify information about which location is passed at which point of time. Since the simultaneous location estimation and mapping function of the SLAM module 112 is well known, details about how the simultaneous location estimation and mapping function is performed will not be described herein.

According to an embodiment, the SLAM module 112 may generate the temporary location data at the point of time corresponding to the first timestamp value while generating the temporary map data based on the first sensor data. The temporary location data denotes data in which the location through which the mapping robot 100 has passed at the point of time corresponding to the first timestamp value is temporarily estimated. When the first sensor data is 3D image data received from a 3D laser scanner, the SLAM module 112 may perform the simultaneous location estimation and mapping function, based on sequentially received pieces of 3D image data. At this time, map data and location data temporarily prepared by the SLAM module 112 may include a sensing error, and the sensing error may accumulate and gradually increase over time. The temporary map data and the temporary location data may denote data from which such a sensing error is not removed. For example, the temporary map data and the temporary location data may include the sensing error.

The SLAM module 112 may perform a loop closing function as a method of removing the sensing error. The SLAM module 112 may detect a loop closure. In the present specification, the loop closure denotes that the mapping robot 100 re-visits a location that has been passed. The SLAM module 112 may compare current data that is currently received first sensor data and previous data that is previously received first sensor data, and when a similarity therebetween is greater than a pre-set threshold value, determine that the loop closure has occurred. When the first sensor unit 130 is a 3D laser scanner, pieces of 3D image data obtained at the same location may be very similar. The pieces of 3D image data received from the 3D laser scanner may be converted into pre-set coordinate systems according to an attitude of the mapping robot 100 such as to be easily compared to each other. The mapping robot 100 re-visiting the location that has been passed does not only include re-visiting the same coordinates, but also include re-visiting a location adjacent to a location that has been visited.

The current data is not compared with all pieces of previous data, but may be compared with some pieces of the previous data to reduce a throughput. The some pieces of previous data to be compared may be previous data of a starting point or previous data of an intersection. The some pieces of previous data to be compared may be pieces of previous data at a point of time when the loop closure may occur, based on a moving path predicted based on the temporary location data.

According to another embodiment, the SLAM module 112 may use the second sensor data to detect the loop closure. The SLAM module 112 may compare current data that is currently received second sensor data and previous data that is previously received second sensor data, and when a similarity therebetween is greater than a pre-set threshold value, determine that the loop closure has occurred. When the second sensor unit 140 is a WiFi scanner, pieces of wireless data obtained at the same location may be very similar. With respect to the second sensor data as well, the current data may not be compared with all pieces of the previous data, but may be compared with some pieces of previous data to reduce throughput.

When the loop closure is detected based on the first sensor data, the SLAM module 112 may identify a previous passing time at which a current location has been passed before, by using the first timestamp value tagged to the first sensor data. The previous passing time identified by using the first sensor data is referred to as a first previous passing time. When the loop closure is detected based on the second sensor data, the SLAM module 112 may also identify a previous passing time at which the current location has been passed before, by using the second timestamp value tagged to the second sensor data. The previous passing time identified by using the second sensor data is referred to as a second previous passing time. The SLAM module 112 may finally determine that the loop closure has occurred when a difference between the first previous passing time and the second previous passing time is smaller than a pre-set threshold value.

The SLAM module 112 removes the sensing error from the temporary map data and the temporary location data in response to the detection of the loop closure, thereby generating the indoor map information of the target building and the moving path information of the mapping robot 100. The SLAM module 112 may generate the corrected location data by correcting the temporary location data in response to the detection of the loop closure, and generate the moving path information based on the corrected location data. Also, when the loop closure is detected, the SLAM module 112 may remove the sensing error from the temporary map data, thereby generating the indoor map information of the target building.

According to an embodiment, a difference between the temporary location data at a current time when the loop closure is detected and the temporary location data at the first previous passing time corresponds to the sensing error accumulated between the first previous passing time and the current time, and thus the SLAM module 112 may identify information about the sensing error based on the difference between the temporary location data at the current time and the temporary location data at the first previous passing time while matching the temporary location data at the current time and the temporary location data at the first previous passing time. The SLAM module 112 may correct the sensing error from the temporary location data to generate the corrected location data. The corrected location data may be obtained by removing the sensing error from the temporary location data. The corrected location data related to the location of the mapping robot 100 also includes an estimation error, but includes a much smaller error compared to the temporary location data.

The SLAM module 112 may generate the moving path information based on the corrected location data. Because the first timestamp value is timestamped to the first sensor data, the moving path information includes the corrected location data at the point of time corresponding to the first timestamp value. In other words, the moving path information is information about a path along which the mapping robot 100 moved, and may include information about a time and location at which actual passing occurred according to the first sensor data to which the first timestamp value is tagged.

The tagging module 113 may estimate the sensing location at the point of time corresponding to the second timestamp value, based on the moving path information. The moving path information includes information about the time and location of the mapping robot 100 along a path, and thus the tagging module 113 may identify the location where the mapping robot 100 was located at the point of time corresponding to the second timestamp value. Such a location may be referred to as the sensing location. According to an embodiment, the tagging module 113 may estimate the sensing location at the point of time corresponding to the second timestamp value via interpolation using the corrected location data at the point of time corresponding to the first timestamp value. The point of time corresponding to the first timestamp value may not accurately match the point of time corresponding to the second timestamp value. Two first timestamp values adjacent to the second timestamp value may be selected. Corrected location data corresponding to the two first timestamp values may be determined. The sensing location at the point of time corresponding to the second timestamp value may be estimated by performing interpolation based on a difference between the two first timestamp values and the second timestamp value, assuming that the mapping robot 100 linearly moves at a constant speed between the points of time corresponding to the two first timestamp values.

It may not be assumed that the mapping robot 100 linearly moves at a constant speed between the points of time corresponding to the two adjacent first timestamp values. For example, the mapping robot 100 may move irregularly. In this case, the location at the point of time corresponding to the second timestamp value may be determined based on the locations at the points of time corresponding to at least two first timestamp values adjacent to the second timestamp value. The tagging module 113 may estimate a type of movement of the mapping robot 100 based on the locations at the points of time corresponding to the at least two first timestamp values, and estimate the location at the point of time corresponding to the second timestamp value based on the type of movement and the locations at the points of time corresponding to the first timestamp values.

The tagging module 113 may estimate the sensing location based on the location where the mapping robot 100 was located at the point of time corresponding to the second timestamp value. Strictly, the location at the point of time corresponding to the second timestamp value denotes the location of the first sensor unit 130. On the other hand, the sensing location may denote the location of the second sensor unit 140.

The first sensor unit 130 and the second sensor unit 140 may be present at different locations in the mapping robot 100. The processor 110 may pre-store information about a location relationship between the first sensor unit 130 and the second sensor unit 140. The processor 110 may calculate the location relationship of the second sensor unit 140 with respect to the location of the first sensor unit 130 according to the attitude of the mapping robot 100, and accurately calculate the location of the second sensor unit 140 based on the location of the first sensor unit 130 by using the calculated location relationship. Accordingly, the tagging module 113 may estimate the sensing location based on the location where the first sensor unit 130 was located at the point of time corresponding to the second timestamp value.

The tagging module 113 may tag the sensing location estimated as such to the second sensor data to which the second timestamp value is timestamped. The sensing location may be tagged to all pieces of second sensor data when the tagging module 113 performs such an operation to the all pieces of second sensor data. When the second sensor unit 140 is a camera, the second sensor data to which the sensing location is tagged may include an image captured by the camera and a location of the camera. The location of the camera included in the second sensor data may include a capturing direction of the camera. When the camera is a fixed camera, the capturing direction may be determined through the attitude of the mapping robot 100. When the camera is a gimbals camera, the capturing direction may be determined based on the attitude of the mapping robot 100 and a gimbals angle.

The storing module 114 may store the second sensor data to which the sensing location is tagged. The storing module 114 may store the second sensor data to which the sensing location is tagged in the memory 120. The storing module 114 may store the second sensor data to which the sensing location is tagged in the map cloud server 200. The storing module 114 may combine the second sensor data to which the sensing location is tagged to the indoor map information of the target building.

When the second sensor unit 140 includes a plurality of types of sensors, there may be a plurality of pieces of second sensor data, and the plurality of pieces of second sensor data to which the sensing location is tagged may be generated by the tagging module 113. The indoor map information of the target building may include the plurality of pieces of second sensor data. For example, when the second sensor unit 140 includes a camera and a WiFi module, the second sensor data may include image data captured by the camera at the sensing location and data of WiFi signals received at the sensing location.

The processor 110 may further include an autonomous driving module for autonomous driving of the mapping robot 100, and the driving unit 160 may be driven under control of the autonomous driving module. The autonomous driving module may directly determine the path along which the mapping robot 100 will move. The mapping robot 100 may search the target building before the indoor map information of the target building is created. The autonomous driving module may include an algorithm for searching the target building. For example, the autonomous driving module may include an algorithm for rotating in a particular direction at all intersections to search the target building, or an algorithm for determining a path such that a loop closure occurs after a pre-set moving distance or time.

According to another embodiment, a function of determining the path along which the mapping robot 100 moves may be performed by the map cloud server 200, and the processor 110 may receive the path to be moved from the map cloud server 200.

Figure 4:
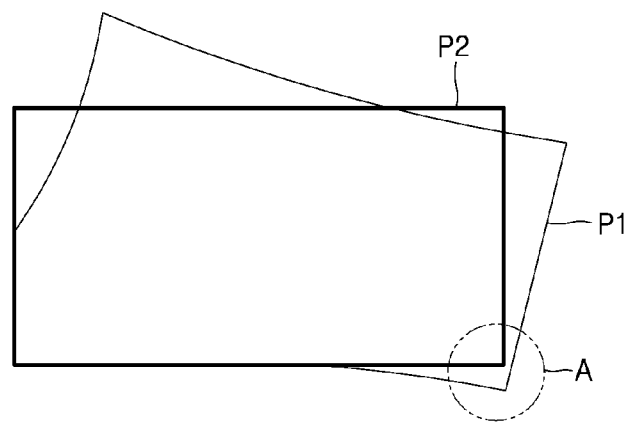
FIG. 4 is reference diagrams for describing operations of a processor of a mapping robot, according to an embodiment.
Figure 5:
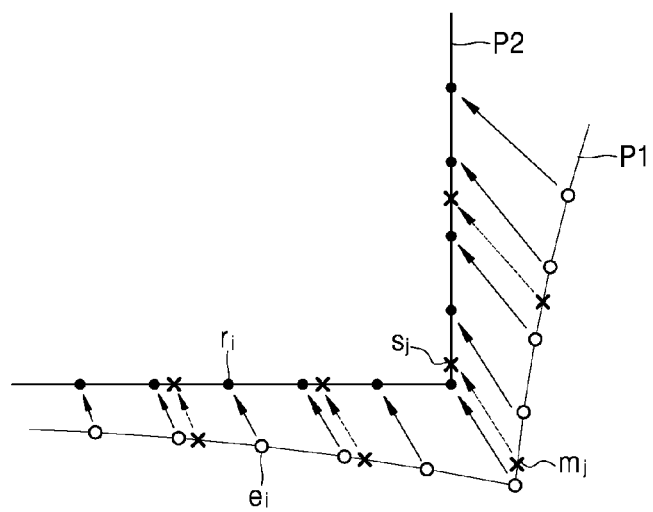
FIG. 5 is an enlarged view of a region A of FIG. 4.

FIGS. 4 and 5 are reference diagrams for describing operations of the processor 110 of the mapping robot 100, according to an embodiment.

Referring to FIGS. 4 and 5, a temporary moving path P1 before a loop closing operation of the SLAM module 112 and an estimated moving path P2 estimated after the loop closing operation are shown. It is assumed that the mapping robot 100 moved a rectangular path counterclockwise from the left bottom. FIG. 5 is an enlarged view of a region A of FIG. 4.

The temporary moving path P1 may be determined based on temporary location data $e_i$. As indicated by the temporary moving path P1, the temporary location data $e_i$ may gradually deviate from an actual path as the sensing error is accumulated with the movement of the mapping robot 100.

The loop closing operation may be an operation of matching the temporary location data $e_i$ at two points of time when a loop closure is detected. Corrected location data $r_i$ generated by the loop closing operation may be obtained by removing the sensing error from the temporary location data $e_i$.

When the processor 110 determines the sensing location whenever the second sensor data is received from the second sensor unit 140 and tags the determined sensing location to the second sensor data, a sensing location $m_j$ of the second sensor data may be determined to be a location on the temporary moving path P1 as shown in FIG. 5 or a location of the adjacent temporary location data $e_i$ on the temporary moving path P1. The processor 110 may determine a current location to be the temporary location data $e_i$ based on the first sensor data, and determine the sensing location of the second sensor data based on the temporary location data $e_i$.

According to the current embodiment, the second timestamp value is timestamped to the second sensor data. The processor 110 may determine the sensing location of the second sensor data to be a location on the estimated moving path P2 by using the second timestamp value of the second sensor data. As a result, the sensing location of the second sensor data may be more accurate, and there is barely any additional time required to identify the sensing location of the second sensor data. In addition, a large amount of pieces of second sensor data may be obtained along the path on which the mapping robot 100 is moved in the target building. The second sensor data measured at a large number of sensing locations in the target building may be collected. Generally, since an operator collects sensor data by moving to a pre-set location with a sensor apparatus, the collection of sensor data is limited to only a certain location, but according to the current embodiment, the second sensor data may be collected at intervals of about several centimeters on the path along which the mapping robot 100 moves in the target building.

Figure 6:
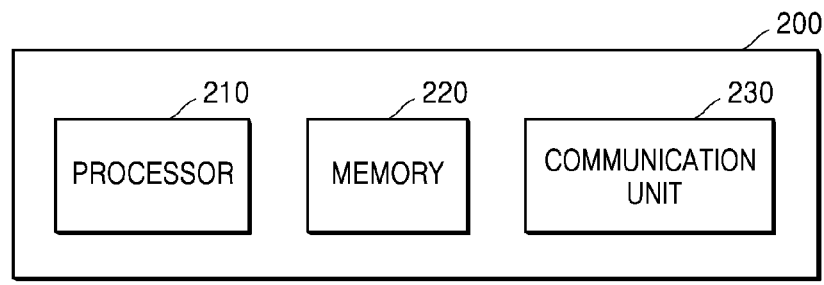
FIG. 6 is a block diagram for describing an internal configuration of a map cloud server, according to an embodiment.

FIG. 6 is a block diagram for describing an internal configuration of the map cloud server 200, according to an embodiment.

Referring to FIG. 6, the map cloud server 200 includes a processor 210, a memory 220, and a communication unit 230.

The processor 110 operates according to a code stored in the memory 120, and includes the memory 220 and the communication unit 230. The memory 220 may store a code for operating the processor 210, and store data generated by operations of the processor 210. The memory 220 may include a storage device storing the indoor map information of the target building. According to another embodiment, the memory 220 may include a database of a separate storage server connected via a network, and the indoor map information of the target building may be stored in the database.

The processor 210 may receive the indoor map information of the target building from the mapping robot 100. The indoor map information may include a 3D map of the target building. The indoor map information may include the second sensor data to which the sensing location is tagged. The sensing location may be specified as a location on the indoor map information of the target building.

The processor 210 may provide the indoor map information of the target building to the service robot 300. The service robot 300 may identify its location by using the second sensor data included in the indoor map information of the target building. The sensing location that is accurately estimated is tagged to the second sensor data. The service robot 300 may estimate its location by comparing measured values with the second sensor data by using a sensor in the target building.

According to another embodiment, the processor 210 may receive departure point information and destination information from the mapping robot 100 and/or the service robot 300. The processor 210 may determine an optimum path from a departure point to a destination by using the indoor map information of the target building, and provide information about the optimum path to the mapping robot 100 and/or the service robot 300. Upon receiving the information about the optimum path, the mapping robot 100 and/or the service robot 300 may move along the optimum path. According to another embodiment, the mapping robot 100 may include the autonomous driving module and move along a path determined by the autonomous driving module.

According to another embodiment, the processor 210 may perform functions of the SLAM module 112, the tagging module 113, and the storing module 114 of FIG. 3. For example, the processor 210 may receive the first sensor data and the second sensor data to which the first timestamp value and the second timestamp value are respectively timestapped, from the mapping robot 100.

The processor 210 may generate the temporary map data based on the first sensor data to which the first timestamp value is timestapped, and generate the temporary location data at the point of time corresponding to the first timestamp value.

The processor 210 may detect the loop closure in which the mapping robot 100 re-visits the location that has been passed. When the loop closure is detected, the processor 210 may correct the temporary location data to generate the corrected location data, and generate the moving path information and the indoor map information of the target building based on the corrected location data.

The processor 210 may estimate the sensing location at the point of time corresponding to the second timestamp value based on the moving path information, and tag the sensing location to the second sensor data. The processor 210 may store the second sensor data to which the sensing location is tagged.

The communication unit 230 may communicate with the mapping robot 100 and/or the service robot 300 by connecting to the network. The communication unit 230 may be referred to as a communication interface and set communication with the mapping robot 100 and/or the service robot 300. The communication unit 230 may be connected to the network via wired communication. The wired communication may include at least one of LAN, WAN, MAN, or ISDN.

Figure 7:
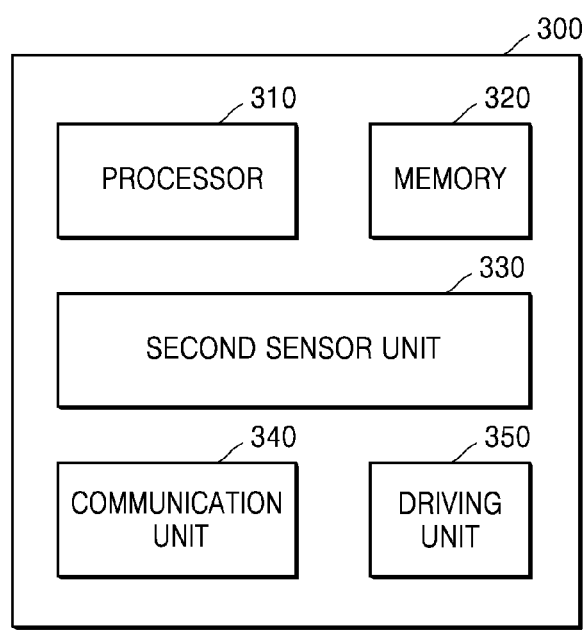
FIG. 7 is a block diagram for describing an internal configuration of a service robot, according to an embodiment.

FIG. 7 is a block diagram for describing an internal configuration of the service robot 300, according to an embodiment.

Referring to FIG. 7, the service robot 300 includes a processor 310, a memory 320, a second sensor unit 330, a communication unit 340, and a driving unit 350.

The processor 310 operates according to codes stored in the memory 320, and controls overall operations of the memory 320, the second sensor unit 330, the communication unit 340, and the driving unit 350. The memory 320 may store the codes for operating the processor 310 and store data generated by operations of the processor 310. The processor 310 may estimate its location in the target building by using sensor data received from the second sensor unit 330 and the indoor map information of the target building stored in the map cloud server 200. The processor 310 will now be described in further detail.

The second sensor unit 330 may include a sensor that generates sensor data of the same type as the second sensor data included in the indoor map information of the target building. The second sensor unit 330 may correspond to the second sensor unit 140 of the mapping robot 100. For example, when the second sensor unit 140 of the mapping robot 100 includes at least one of a camera, a WiFi module, a Bluetooth module, or a geomagnetic sensor, the second sensor unit 330 may also include at least one sensor of the same type as the second sensor unit 140. When the second sensor unit 140 of the mapping robot 100 includes a camera and a WiFi module and the indoor map information of the target building includes image data of the camera and wireless signal data of the WiFi module, the second sensor unit 330 may include one of a camera and a WiFi module or include both the camera and the WiFi module.

A sensor of the first sensor unit 130 of the mapping robot 100 may be expensive and have higher performance than the sensor of the second sensor unit 140. Because the service robot 300 does not include an expensive sensor like the first sensor unit 130 of the mapping robot 100, the service robot 300 may be manufactured inexpensively compared to the mapping robot 100 and manufactured in various types based on functions.

The communication unit 340 may communicate with the mapping robot 100, the map cloud server 200, and/or another service robot 300 by connecting to a network. The communication unit 340 may be referred to as a communication interface supporting wireless communication. The wireless communication may include at least one of cellular communication, WiFi, Bluetooth, BLE, Zigbee, NFC, or RF.

The driving unit 350 is controlled by the processor 310 and enables the service robot 300 to move. The driving unit 350 may include a motor and a plurality of wheels. For example, the driving unit 350 may include a motor driver, a wheel motor, and a rotation motor. The motor driver may perform a function of driving the wheel motor for driving the service robot 300. The wheel motor may drive a plurality of wheels for driving the service robot 300. The rotation motor may be driven to rotate or change a direction of the wheel of the service robot 300.

According to an embodiment, the processor 310 may receive the sensor data from the second sensor unit 330. The processor 310 may receive the indoor map information of the target building from the map cloud server 200. The processor 310 may determine a similarity between the second sensor data to which the sensing location is tagged included in the indoor map information of the target building and the sensor data received from the second sensor unit 330. The processor 310 may extract the second sensor data having a high similarity and estimate a current location of the service robot 300 based on the sensing location tagged to the second sensor data.

According to another embodiment, upon receiving the sensor data from the second sensor unit 330, the processor 310 may transmit the sensor data to the map cloud server 200. The map cloud server 200 may estimate the current location of the service robot 300 based on the sensor data received from the service robot 300, and transmit information about the current location to the service robot 300.

When paths through which the mapping robot 100 and the service robot 300 move in the target building are assigned, the mapping robot 100 may receive the second sensor data at all locations on the paths. The indoor map information of the target building may include second sensor data obtained from all locations on the path and the accurate sensing location may be tagged to the second sensor data. When the service robot 300 is located on the assigned path in the target building, it is highly likely that the second sensor data with a very high similarity to the sensor data received through the second sensor unit 330 is present. Accordingly, the current location of the service robot 300 may be very accurately estimated.

The embodiments of the present disclosure described above may be recorded on a computer readable recording medium by being realized in computer programs executed by using various computers. The computer readable recording medium may continuously store the computer program or store the computer program for execution or downloading. The compute readable recording medium may be various recording medium or storage medium in a form of single hardware component or a combination of a plurality of hardware components, and is not limited to a medium directly connected to a computer system but may be distributed on a network. Examples of the computer readable recording medium include a magnetic medium such as a hard disk, a floppy disk and a magnetic tape, an optical recording medium such as CD-ROM and DVD, a magneto-optical medium such as a floptical disk, and ROM, RAM, flash memory, and the like, which are configured to store program instructions. Other examples of the computer readable recording medium include a recording medium or a storage medium managed by an application store that distributes an application and by a website or a server that supplies or distributes other various types of software.

According to various embodiments of the present disclosure, a method of collecting sensor data to which a sensing location is tagged by using a data collecting apparatus while measuring a location of the data collecting apparatus and creating an indoor map of a target building by moving around an indoor space of the target building and searching a perimeter is provided. Since timestamping is performed while collecting the sensor data and a sensing location of the sensor data is estimated by using a timestamp value, an accurate sensing location may be obtained. In addition, according to various embodiments of the present disclosure, since the indoor map of the target building is created and the sensor data in the target building is collected at the same time, time and costs for collecting the sensor data may be reduced.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be modified in various ways. Such modifications are not to be regarded as a departure from the disclosure, and all such modifications are intended to be included within the scope of the disclosure.

What is claimed is:

1. A location data collecting method using a mobile data collecting apparatus having a processor, a first sensor and a second sensor, the method comprising:
    collecting space data for generating a location and moving path of the mobile data collecting apparatus and sensing location data indicating a sensing location of the mobile data collecting apparatus where the sensing location data is obtained respectively through the first sensor and the second sensor while the data collecting apparatus is currently moving within a target area, and tagging a first timestamp value and a second timestamp value respectively to the space data and the sensing location data;
    generating temporary map data of the target area, and temporary location data at a point of time corresponding to the first timestamp value, based on the space data collected while the data collecting apparatus is currently moving;
    calculating a similarity between pieces of the space data and a similarity between pieces of the sensing location data;
    detecting a loop closure indicating the mobile data collecting apparatus has re-visited a location previously passed by the mobile data collecting apparatus, based on the similarity between the pieces of the space data and the similarity between the pieces of the sensing location data;
    detecting a sensing error in the temporary map data by comparing the space data previously collected with space data collected at the re-visited location;
    generating map information regarding a map of the target area by correcting the sensing error in the temporary map data, and generating moving path information regarding a moving path of the mobile data collecting apparatus on the map of the target area by correcting a sensing error in the temporary location data;
    estimating a sensing location of the mobile data collecting apparatus at a point of time corresponding to the second timestamp value based on the moving path information generated after correcting the sensing error in the temporary location data, using the sensing location data previously collected while the temporary map data were being generated; and
    storing sensing location data indicating the estimated sensing location of the mobile data collecting apparatus on the moving path information,
    wherein the sensing location data indicating the estimated sensing location is used to identify a location of a mobile device moving within the map of the target area.

2. The data collecting method of claim 1, wherein
    the moving path information comprises the location data at the point of time corresponding to the first timestamp value, and
    the sensing location at the point of time corresponding to the second timestamp value is estimated through interpolation using the location data at the point of time corresponding to the first timestamp value.

3. The data collecting method of claim 1, wherein
    the first sensor comprises at least one of a laser scanner, a camera, or a red, green, blue, depth (RGBD) sensor.

4. The data collecting method of claim 1, wherein
    the second sensor comprises at least one of a camera, a WiFi module, a Bluetooth module, a geomagnetic sensor, a laser scanner, or an RGBD sensor.

5. The data collecting method of claim 4, wherein the first sensor is a 3-dimensional (3D) laser scanner.

6. A non-transitory computer readable recording medium storing a computer program which, when executed by a processor, performs the location data collecting method of claim 1.

7. A location data collecting system comprising:
    a mobile data collecting apparatus having a first sensor and a second sensor;
    at least one processor in communication with the first sensor and the second sensor, and having a plurality of functional modules each configured to perform a predefined function, the functional modules including,
    a timestamping module configured to collect space data for generating a location and moving path of a mobile data collecting apparatus and sensing location data indicating a sensing location of the mobile data collecting apparatus where the sensing location data is obtained respectively through the first sensor and the second sensor while the first sensor and the second sensor is currently moving within a target area, and tag a first timestamp value and a second timestamp value respectively to the space data and the sensing location data;
    a simultaneous localization and mapping (SLAM) module configured to generate temporary map data of the target area based on the space data, generate temporary location data at a point of time corresponding to the first timestamp value, calculate a similarity between pieces of the space data and a similarity between pieces of the sensing location data, detect a loop closure indicating the mobile data collecting apparatus has re-visited a location previously passed by the mobile data collecting apparatus, based on the similarity between the pieces of the space data and the similarity between the pieces of the sensing location data, detect a sensing error in the temporary map data by comparing the space data previously collected with space data collected at the re-visited location, generate map information regarding a map of the target area by correcting the sensing error in the temporary map data, and generate moving path information regarding a moving path of the mobile data collecting apparatus on the map of the target area by correcting a sensing error in the temporary location data;
    a tagging module configured to estimate a sensing location of the mobile data collecting apparatus at a point of time corresponding to the second timestamp value based on the moving path information generated after correcting the sensing error in the temporary location data, using the sensing location data previously collected while the temporary map data were being generated; and a storing module configured to store sensing location data indicating the estimated sensing location of the mobile data collecting apparatus on the moving path information, wherein the sensing location data indicating the estimated sensing location is used to identify a location of a mobile device moving within the map of the target area.

8. The data collecting system of claim 7, wherein the first sensor comprises at least one of a laser scanner, a camera, or a red, green, blue, depth (RGBD) sensor.

9. The data collecting system of claim 7, wherein the first sensor is a 3-dimensional (3D) laser scanner, and the second sensor comprises at least one of a camera, a WiFi module, a Bluetooth module, or a geomagnetic sensor.

10. A location data collecting method using a data collecting apparatus having a first sensor and a second sensor, the method comprising:

collecting, by a first processor, space data for generating a location and moving path of the mobile data collecting apparatus and sensing location data indicating a sensing location of the mobile data collecting apparatus where the sensing location data is obtained respectively through the first sensor and the second sensor while the data collecting apparatus is currently moving within a target area, and tagging a first timestamp value and a second timestamp value respectively to the space data and the sensing location data;

generating, by a second processor, temporary map data of the target area, and temporary location data at a point of time corresponding to the first timestamp value, based on the space data collected while the data collecting apparatus is currently moving;

calculating, by the second processor, a similarity between pieces of the space data and a similarity between pieces of the sensing location data;

detecting, by the second processor, a loop closure indicating the mobile data collecting apparatus has re-visited a location previously passed by the mobile data collecting apparatus, based on the similarity between the pieces of the space data and the similarity between the pieces of the sensing location data;

detecting, by the second processor, a sensing error in the temporary map data by comparing the space data previously collected with space data collected at the re-visited location;

generating, by the second processor, map information regarding a map of the target area by correcting the sensing error in the temporary map data, and generating moving path information regarding a moving path of the mobile data collecting apparatus on the map of the target area by correcting a sensing error in the temporary location data;

estimating, by the second processor, a sensing location of the mobile data collecting apparatus at a point of time corresponding to the second timestamp value based on the moving path information generated after correcting the sensing error in the temporary location data, using the sensing location data previously collected while the temporary map data were being generated; and storing, by the second processor, sensing location data indicating the estimated sensing location of the mobile data collecting apparatus on the moving path information, wherein the sensing location data indicating the estimated sensing location is used to identify a location of a mobile device moving within the map of the target area.

11. The data collecting method of claim 10, wherein the first processor is provided in the data collecting apparatus and the second processor is provided in a computer server apparatus connected to the data collecting apparatus through a network.

* * * * *